United States Patent [19]

Cruchelow et al.

[11] 4,224,899
[45] Sep. 30, 1980

[54] PET SHELTER

[76] Inventors: Marilyn Cruchelow; Wayne L. Cruchelow, both of 1315-39th St., Desmoines, Iowa 50311

[21] Appl. No.: 889,496

[22] Filed: Mar. 23, 1978

[51] Int. Cl.³ .............................................. A01K 1/03
[52] U.S. Cl. ....................................... 119/19; 119/15
[58] Field of Search ................................ 119/1, 15, 19

[56] References Cited
U.S. PATENT DOCUMENTS

| 807,196 | 12/1905 | O'Brien | 119/19 |
| 2,932,279 | 4/1960 | Giles | 119/15 |
| 3,651,786 | 3/1972 | Patterson et al. | 119/19 X |
| 3,738,322 | 6/1973 | Smith | 119/15 |
| 3,797,461 | 3/1974 | Breeden | 119/19 |

Primary Examiner—Russell R. Kinsey
Assistant Examiner—Robert P. Swiatek
Attorney, Agent, or Firm—Zarley, McKee, Thomte, Voorhees & Sease

[57] ABSTRACT

A pet shelter utilizes a hollow housing having a pair of openings on one wall and a large opening in another opposed wall thereof. One of the pair of openings is provided with a transparent plastic-like hinged door, with the other opening adjacent thereto provided with a slip hinge arrangement for mounting a transparent window or screened panel thereover. The opposed opening is covered with a pair of slidable screen-like doors. An awning is disposed over the pair of adjacent openings, one of which is provided with a cleated ramp. The pair of openings may be maintained in a closed position if desired. The shelter is installed having the awning and ramp and pair of openings on the outside of the building permitting ingress and egress of the pet to the shelter-like structure of the housing. The pet may be precluded from entering the interior of the house by closing the sliding screen panels.

3 Claims, 4 Drawing Figures

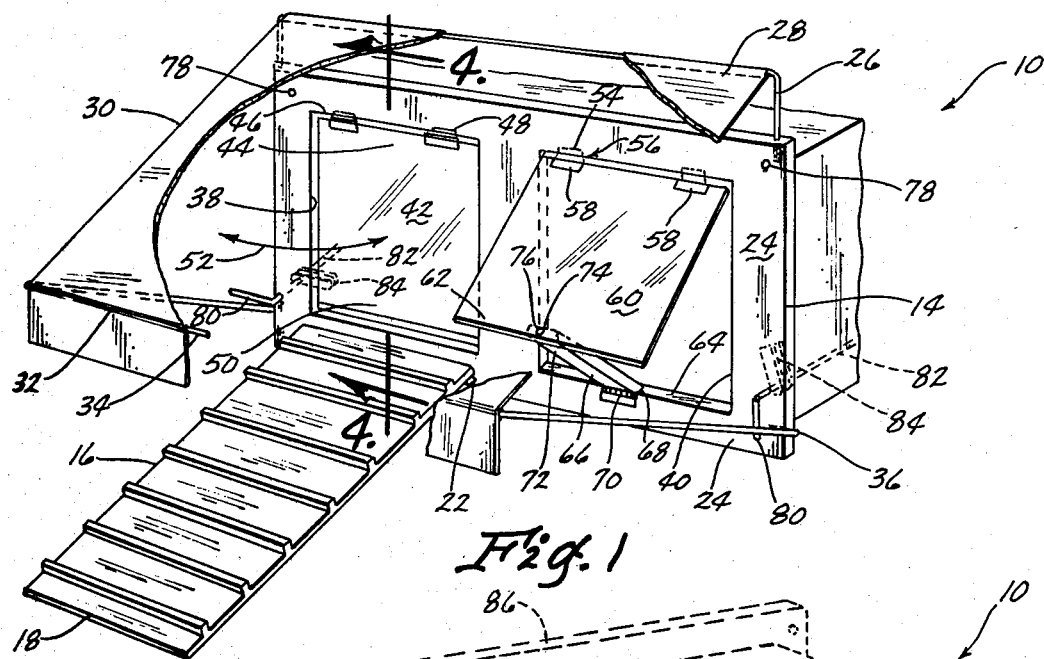
Fig. 1
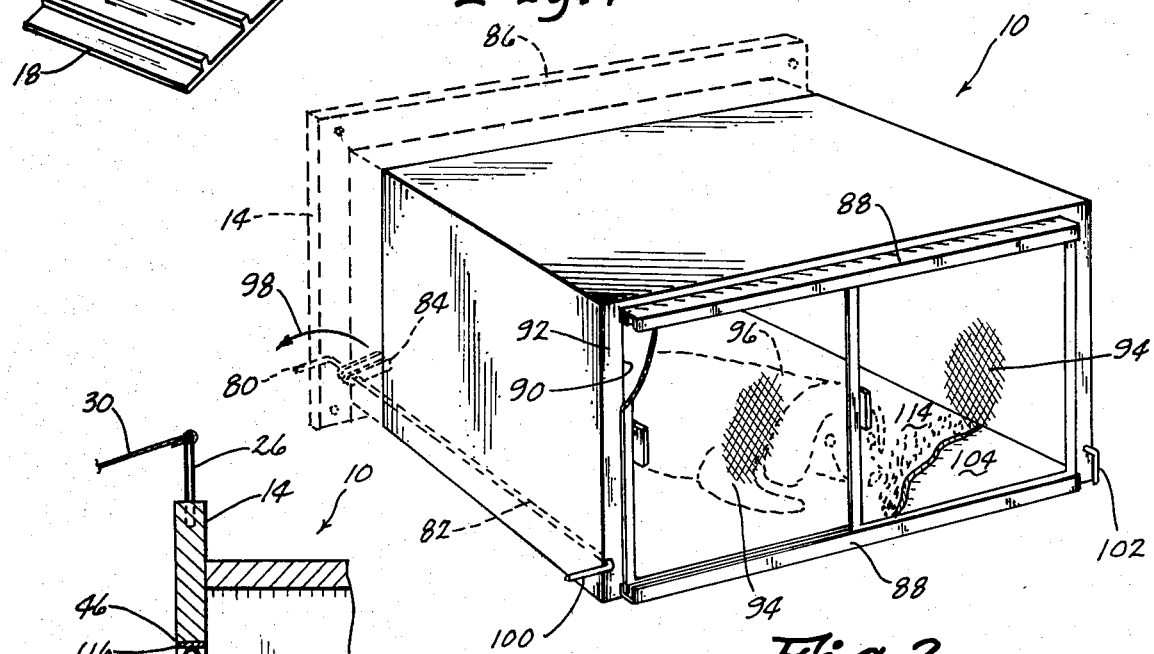
Fig. 2
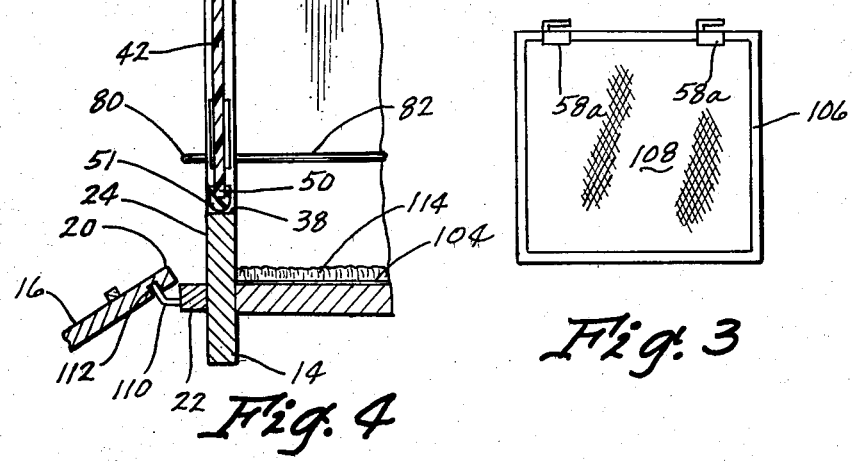
Fig. 3
Fig. 4

PET SHELTER

BACKGROUND OF THE INVENTION

This invention relates to pet shelters and more particularly to that class adapted to be installed within a wall of a house. Prior devices did not allow selective retention of the animal within the shelter nor prevent other animals from entering. Prior devices also did not allow clear visibility to the outside of the house.

SUMMARY OF THE INVENTION

A primary object of the present invention is to provide an animal enclosure or shelter which is suitable for mounting in the wall of a house.

Another object of the present invention is to provide a pet shelter enabling the pet to leave the confines of the house at his will.

Still another object of the present invention is to provide a pet shelter which also may be utilized to restrain an animal therein at the will of the pet owner.

Yet another object of the present invention is to provide a shelter for pets having a ramp thereon, thereby facilitating convenient ingress and egress of the pet into the shelter from the level of the outside grade therebelow.

A further object of the present invention is to provide a pet shelter which enables air to circulate therethrough at the will of the user.

Another object of the present invention is to provide a shelter in which the rays of the sun are precluded from entering the shelter if so desired.

Still another of the present invention is to provide a pet shelter enabling the animal to gain visual access to the outside of the house, as desired.

Yet another object of the present invention is to provide a pet shelter which may be selectively closed off to either the outside or inside of the house while permitting the pet to enter the confines of the shelter.

A further object of the present invention is to provide a shelter which also may serve as sleeping quarters, and a feeding station for the pet.

A further object of the invention is the provision of a pet shelter which provides a heated comfortable environment for pets during winter.

A further object of the invention is the provision of a device which facilitates the use of a dog as a watch dog inasmuch as he will have access to the outside while continuing to have the comfort of the indoor environment.

A further object of the present invention is the provision of a device which permits the minimizing of frozen water and food for the pet as well as the maintenance of a place which is substantially free of flies in the summer months.

A further object of the present invention is the provision of a device which will help keep the pet cool in the summer months and free from flies and other insects also.

A further object of the present invention is the provision of a device which will minimize the loneliness which the pet experiences and permit the owner to have access to the pet.

A further object of the present invention is the provision of a device which provides the pet with freedom when the owner is away from home, while at the same time providing a comfortable environment for the pet.

A further object of the present invention is the provision of a device which minimizes the necessity for cleaning up after the pet within the house when the weather is rainy, muddy or snowy.

A further object of the present invention is the provision of a device which eliminates the necessity for rising early to let the pet out of the house.

A further object of the present invention is the provision of a device which permits the pet to go outdoors when it is sick or has the need to relieve itself.

A further object of the present invention is the provision of a device which permits the pet to stay at home in its natural surroundings during the time that the owner takes vacation or is away from home, rather than requiring the pet to be taken to a kennel.

Pet shelters are substantially divided into two major categories. The most common type of shelter is adapted to be installed outside a home having at least one doorway leading thereinto. The other category includes shelters adapted to be installed within a home, acting in the main as an enclosure or as a bed. None of the prior art devices serve the combinational purpose of acting as a shelter and as a passageway which enables a pet to enter the confines of the house at his will, if desired, or to be permitted free access to the exterior of the house, at the pet's will, without being allowed access to the interior of the house. Alternatively, the present invention enables the pet to enter the shelter without having access to the interior of the house. If desired, the present invention enables the pet to be constrained within the shelter. Air circulation, shades, window-like structures, and ramps all facilitate the use of the apparatus at a comfortable cool and clean area in which the pet is enabled to be fed, housed, or provided with access into the home.

These objects as well as other objects of the present invention will become more readily apparent after reading the following description of the accompanying drawings.

BRIEF DESCRIPTION OF THE DRAWINGS

FIG. 1 is a frontal perspective view of the present invention shown installed in a wall.

FIG. 2 is a rear perspective view of the present invention.

FIG. 3 is a front elevation view of a replacement screen panel for the present invention.

FIG. 4 is a side elevation cross sectional view of the apparatus taken through lines 4—4, viewed in the direction of arrows 4—4, of the apparatus shown in FIG. 1.

DESCRIPTION OF THE PREFERRED EMBODIMENT

The structure and method of fabrication of the present invention is applicable to a rectangular hollow housing, preferably fabricated from sheet metal. Wooden materials may also be utilized in the construction of the housing, which has a pair of adjacent openings disposed in one wall and a single larger opening disposed in an opposed wall. The wall having the pair of openings is provided with a flange-like shape extending outwardly from the lateral surfaces comprising the housing. One of the pair of openings is provided with a double swinging transparent panel, utilizing a double swinging hinge to affix such panel to the uppermost marginal edge of the opening. The lowermost marginal edge of the panel is provided with a rubber-like gasket which enables the panel to close against the lowermost marginal edge of the opening, thereby preventing insects, or the like, from entering the housing. The other panel is fitted with a pair of half portions of slip hinges adjacent the exterior surface of the flange member at a location adjacent to the uppermost marginal edge of the other opening. A pair of panels are provided, one of which is transparent, and the other of which is fabricated with a screen-like mesh disposed within a rigid metallic frame. Both of the pair of panels are provided having a pair of complimentary shaped slip hinge half portions secured thereto, such that either panel may be secured to the other opening whereby the panel's lowermost edge is permitted to be pivoted upwardly and outwardly from the exterior surface of the shelter. A prop-like arm is utilized to maintain the lowermost edge of either of the panels in an opened position by having one end of the arm hingeably secured to the lowermost marginal edge of the housing and by having the other end of the arm fitted with a pin which may be installed into an opening in the lowermost regions of either of the panels. Transparent panels may be fabricated from a plastic-like material, such as acetate.

A cleated ramp is provided for use when the shelter is installed in a wall of a home such that the floor of the shelter is somewhat above the grade of the earth outside the shelter and immediately below the same. Such ramp is removably installed beneath the double swinging panel utilizing a pin extending outwardly from the shelter located below the opening in which the double swing panel is installed. The outermost edge of the ramp is permitted to rest upon the grade. An awning attachment is fitted to the present invention utilizing an inverted U-shaped wire-like member whose free ends of the leg portions thereof are secured to the uppermost marginal edge of the flange member. The joining portion of the inverted U-shaped member carries one edge of the awning therealong. An opposed edge of the awning is secured to a rod pivotally secured to the vertical marginal edges of the flange member such that the awning is disposed outwardly from the flange member and downwardly from the lowermost marginal edge thereof so as to reside partially covering and shielding both of the pair of openings and a portion of the inclined ramp therebelow.

The housing has a pair of opposed track-like sections secured adjacent the larger opening located in opposed relationship to the wall carrying the pair of openings. A pair of frames, each having a screen-like covering are slidably disposed within the tracks such that such screens may be disposed in a closed condition totally covering the larger opening. If desired, the screen may be disposed in an open condition thereby maintaining access into the housing by the pet.

A pair of rods are journaled in the side vertical walls of the housing, extending substantially in a horizontal direction. One end of each of the rods are provided with a handle-like member, located adjacent the marginal edges of the larger opening of the shelter. Each of the rods carry at the other end thereof, a U-shaped member, whose open mouth portion is disposed adjacent the lowermost marginal edge of the pair of openings. When the rods are rotated in a preferred direction, the U-shaped members engage the pair of adjacent panels, when they are residing in a vertical plane. In this fashion, the shelter may be secured from unwanted use as a passageway, prohibiting the pet from entering the shelter or leaving same at the will of the user. Another pair of handles may be secured to the end of the rods adjacent the location of the U-shaped members such that the other handles enable the pair of panels to be manipulated into a locked or unlocked condition by a user located on the outside of the home.

Now referring to the figures, and more particularly to the embodiment illustrated in FIG. 1 showing the present invention 10 having a flange-like member 14 to which a ramp 16 is affixed. End 18, of ramp 16, is adapted to rest upon the surface of the grade, not shown. End 20, of ramp 16, is adapted to rest upon bar 22, affixed to surface 24, of flange member 14. Inverted U-shaped member 26 is shown supporting end 28 of awning 30. End 32, of awning 30, is shown supported on rod 34. End 36, of rod 34, is shown pivotably secured to a marginal edge of flange member 14, such that awning 30 is permitted to extend covering a portion of ramp 16. Openings 38 and 40 are shown in side by side relationship, located within flange member 14. Transparent panel 42 has the uppermost regions 44 thereof pivotably secured to the uppermost marginal edge 46, of opening 38, utilizing hinge 48 therefor. Lowermost region 50, having rubber gasket 51 attached thereto, when moved in the direction of arrows 52, permits panel 42 to swing inwardly and outwardly from opening 38. Portions 54 of slip hinges 56 engage slip hinge portions 58, secured to transparent panel 60. Thus, lowermost marginal edge 62, of transparent panel 60, may be disposed upwardly and outwardly from the lowermost marginal edge 64, of opening 40. Bar 66 is shown having end 68 hingeably secured to marginal edge 64, utilizing hinge 70 therefor. End 72, if bar 66, is provided with hinge-like member 74 shown passing through opening 76 of panel 60. Screws 78 are utilized to secure flange member 14 to a wall, not shown. Handles 80 are shown extending outwardly from surface 24. Dotted lines 82 depict one of a pair of rods, each having a U-shaped member 84 affixed thereto. Such U-shaped member is adapted to engage a marginal edge of transparent panel 42 and transparent panel 60, when the U-shaped member is disposed rotated in a preferred position by manual manipulation of handles 80.

FIG. 2 illustrates flange member 14, shown in FIG. 1, by dotted lines 86. Tracks 88 are shown disposed adjacent opening 90 in wall 92. Wall 92 is shown disposed opposite surface 24, shown in FIG. 1. Panels 94 are illustrated in side by side relationship and installed to slide within tracks 88 so as to be disposed covering opening 90, if desired. Alternatively one of panels 94, having a screen-like center area, is selectively positioned juxtaposed to another panel 94, thereby enabling pet 96 to grain free access to the interior of the present invention. U-shaped member 84 may be disposed in the direction of arrow 98 upon the manipulation of handle 100, in generally the same direction. Handle 102, is located so as to control another U-shaped member, not shown, disposed within the flange-like member, depicted by dotted lines 86. Floor 104 may be of carpeting or other soft material, thereby providing a soft cleanable resting surface for pet 96. Such enclosures, however fabricated, may be of sufficient size for any domesticated animals, including cats, dogs, or the like. As can be seen, panels 42 and 60, shown in FIG. 1, may be closed against use by manipulation of handles 100 and 102. Panels 94 may also be similarly closed, thereby confining pet 96 within the present invention 10 or precluding the use thereof as a passageway. Access into the interior of the present invention 10 may be achieved selectively by opening only panels 94 or either panel 42 or 60.

FIG. 3 illustrates frame 106 having a wire-like screen element 108 secured thereto. Slip hinge portions 58a are provided secured to frame 106, for attachment to slip hinge portions 54, as shown in FIG. 1. Thus, frame 106 may supplant panel 60, shown in FIG. 1, as desired. When this is done opening 40 may be utilized to provide fresh air into the confines of the present invention.

FIG. 4 illustrates inclined ramp 16, shown having end 20 thereof resting on bar 22. Pin 110 is secured to bar 22 and is provided having the other end thereof installed in opening 112 of ramp 16. Carpeting 114 is shown disposed on floor 104. Hinge 48 utilizes portion 116 thereof shown secured to the lowermost marginal edge 46 of opening 38.

One of the advantages of the present invention is an animal enclosure or shelter which is suitable for mounting in the wall of a house.

Another advantage of the present invention is a pet shelter enabling the pet to leave the confines of the house at his will.

Still another advantage of the present invention is a pet shelter which also may be utilized to restrain an animal therein at the will of the pet owner.

Yet another advantage of the present invention is a shelter for pets having a ramp thereon, thereby facilitating convenient ingress of egress of the pet into the shelter from the level of the outside grade therebelow.

A further advantage of the present invention is that a pet shelter which enables air to circulate therethrough at the will of the user.

Another advantage of the present invention is a shelter in which the rays of the sun are precluded from entering the shelter if so desired.

Still another advantage of the present invention is a pet shelter enabling the animal to gain visual access to the outside of the house, as desired.

Yet another advantage of the present invention is a pet shelter which may be selectively closed off to either the outside or inside of the house while permitting the pet to enter the confines of the shelter.

A further advantage of the present invention is a shelter which also may serve as sleeping quarters, and a feeding station for the pet.

Thus, there is disclosed in the above description and in the drawings, an embodiment of the invention which fully and effectively accomplishes the objects thereof. However, it will become apparent to those skilled in the art, how to make variations and modifications of the instant invention. Therefore, this invention is to be limited, not by the specific disclosure herein, but only by the appending claims.

The embodiment of the invention in which an exclusive privilege or property is claimed are defined as follows:

1. A pet shelter adapted to be mounted in an opening of a house wall comprising:
   a housing having a front wall, a top wall, a bottom wall,
   opposite side walls and a rear wall,
   said rear wall of said housing being provided with an interior opening,
   screen means removably mounted in covering relation over said interior opening for permitting sound, air and light to enter said housing through said opening, while at the same time containing said pet within said housing,
   a mounting flange extending outwardly from said housing adjacent said front wall, said flange having a rearwardly presented surface adapted to abut against the exterior of said house wall around the margins of said opening, whereby said front wall will be disposed on the exterior of said house wall, and said rear wall will be disposed on the interior of said house wall;
   at least one opening in said front wall, said opening having upper, lower, and opposite side margins;
   a door mounted in covering relation over said opening;
   hinge means connecting said door to said upper margin of said opening for pivotal movement about a horizontal axis between an inner position wherein the lower edge of said door is located rearwardly of said front wall and an outer position wherein said lower edge of said door is located outwardly of said front wall whereby a pet may enter and exit said housing by pushing said door to said inner and outer positions, respectively;
   locking means for selectively, retentively engaging and holding said door in a closed position between said inner and outer positions, said door closing said opening when in said closed position;
   said locking means comprising a manually operable handle extending from both said front and rear walls of said housing for causing said locking means to selectively, retentively engage said door and for selectively causing said locking means to release said door for swinging movement.

2. A pet shelter according to claim 1 comprising track means holding said screen means for sliding movement from a closed position in covering relation over said interior opening to an open position permitting access to the interior of said housing through said rear wall.

3. A pet shelter according to claim 1 wherein said locking means comprises a rod extending from outside said front wall through said housing and said rear wall, a U-shaped member being fixed to said rod at a point adjacent said door, said rod being selectively movable to cause said U-shaped member to move into and out of retentive engagement with said door.

* * * * *